United States Patent
Tanaka et al.

(10) Patent No.: US 9,014,767 B2
(45) Date of Patent: Apr. 21, 2015

(54) LID MEMBER WITH WATERPROOF FUNCTION, AND METHOD OF MANUFACTURING THEREOF

(75) Inventors: Hirokazu Tanaka, Fujisawa (JP); Osamu Ito, Fujisawa (JP); Yuichi Kakihara, Fujisawa (JP)

(73) Assignee: Nippon Mektron, Ltd. (JP)

( * ) Notice: Subject to any disclaimer, the term of this patent is extended or adjusted under 35 U.S.C. 154(b) by 42 days.

(21) Appl. No.: 13/814,096

(22) PCT Filed: Oct. 27, 2011

(86) PCT No.: PCT/JP2011/074744
§ 371 (c)(1),
(2), (4) Date: Feb. 4, 2013

(87) PCT Pub. No.: WO2012/077424
PCT Pub. Date: Jun. 14, 2012

(65) Prior Publication Data
US 2013/0244737 A1    Sep. 19, 2013

(30) Foreign Application Priority Data
Dec. 9, 2010    (JP) .................................. 2010-275037

(51) Int. Cl.
*H04M 1/00* (2006.01)
*H04M 1/02* (2006.01)
*H01R 13/52* (2006.01)
*B23P 19/00* (2006.01)

(52) U.S. Cl.
CPC ......... *H04M 1/0202* (2013.01); *H01R 13/5213* (2013.01); *B23P 19/00* (2013.01); *H01R 2201/16* (2013.01)

(58) Field of Classification Search
CPC .................... H04B 2001/3894; H01R 13/5216
USPC ............ 455/575.1, 575.3, 575.8, 90.3, 550.1, 455/128; 361/679, 748; 607/96
See application file for complete search history.

(56) References Cited

U.S. PATENT DOCUMENTS

| 2006/0256510 A1* | 11/2006 | Nakasono et al. ............ 361/679 |
| 2007/0118189 A1* | 5/2007 | Nakamura ....................... 607/96 |
| 2009/0111539 A1* | 4/2009 | Matsuda et al. ........... 455/575.3 |

FOREIGN PATENT DOCUMENTS

| JP | 2001-250629 A | 9/2001 |
| JP | 2006-084438 A | 3/2006 |
| JP | 2010-186562 A | 8/2010 |

* cited by examiner

Primary Examiner — John J Lee
(74) Attorney, Agent, or Firm — Harness, Dickey & Pierce, P.L.C.

(57) ABSTRACT

A lid member with a waterproof function opening and closing an opening portion formed in a housing is structured by a rubber-like elastic material seal portion provided with a projection portion which is integrally formed in one surface of a resin main body of the lid member and is stored within the opening portion, an annular projection portion which is integrally formed in an outer peripheral surface of the projection portion and comes into close contact with a peripheral surface of the opening portion, and a reinforcing portion which extends from the annular projection portion to the vicinity of a junction portion of the outer peripheral surface with the main body, and a thermoplastic elastomer retention portion which exists so as to come into close contact with an outer peripheral surface of the reinforcing portion, and is integrally formed in a side of the main body.

7 Claims, 3 Drawing Sheets

LID MEMBER WITH WATERPROOF FUNCTION, AND METHOD OF MANUFACTURING THEREOF

CROSS-REFERENCE TO RELATED APPLICATIONS

This application is a U.S. National Stage Application of International Application No. PCT/JP2011/074744 filed on Oct. 27, 2011, and published in Japanese as WO 2012/077424 A1 on Jun. 14, 2012. This application claims priority to Japanese Application No. 2010-275037 filed Dec. 9, 2010. The disclosures of the above applications are incorporated herein by reference.

BACKGROUND OF THE INVENTION

1. Field of the Invention

The present invention relates to a lid member with a waterproof function of an electronic equipment and a method for manufacturing the same, and more particularly to a seal structure such as to prevent a water drop from entering into an inner portion of an electronic equipment such as a cell phone terminal or the like.

Accordingly, the lid member with the waterproof function in accordance with the present invention is preferably used as a seal structure of a connector portion of a waterproof electronic equipment.

2. Description of the Conventional Art

Conventionally, in a portable terminal, a connector lid which opens and closes the connector is provided.

In other words, the connector lid which opens and closes a communication port for the connector is fixed and retained to a side of a housing (a case) by a band-like flexible band portion.

Further, a small rib-shaped seal ring portion is formed around a whole periphery in a peripheral side surface of the connector lid which occludes the connector.

In accordance with the above-mentioned structure, the connector lid seals the communication port for the connector in a watertight manner.

This kind of connector lid is specifically structured such that a waterproof plug, in which a rubber packing formed by a silicone rubber is insert molded around a plug member which is formed in an inner side of a lid member formed by, for example a polycarbonate, is integrated with the connector lid by means of a ultrasonic deposition (refer to Japanese Unexamined Patent Publication No. 2006-84438).

However, since the waterproof plug exists in the inner side of the connector lid, there has been brought about a problem that both a thickness of a whole of the connector lid and a manufacturing cost are increased.

Accordingly, there has been made a proposal of integrating the waterproof member with the connector lid so as to achieve a thinning of the waterproof structure of the connector lid (refer to Japanese Unexamined Patent Publication No. 2010-186562).

However, there has been brought about a problem that the connector lid is damaged at a time of integrating the waterproof member, which is made of the rubber-like elastic material, with the connector lid which is made of the resin material such as the polycarbonate or the like.

In other words, since an electronic equipment such as a cell phone or the like gives importance to an outer appearance beauty very much, it is necessary to avoid a matter that a part of the rubber-like elastic material constructing the waterproof member generates a burr leakage protruding to an unnecessary position.

In order to achieve this purpose, it is necessary to raise a mold clamping pressure to a fixed value or more, at a time of molding the waterproof member which is made of the rubber-like elastic material.

As a result, there has existed unavoidably a problem that a coated surface of the connector lid made of the resin material such as the polycarbonate or the like is damaged. Particularly, in the case that a thin extension portion is provided for preventing the waterproof member, which is made of the rubber-like elastic material, from peeling off from the connector lid which is made of the resin material, the problem mentioned above has appeared remarkably.

SUMMARY OF THE INVENTION

An object of the present invention is to provide a lid member with a waterproof function which can achieve a thinning of the lid member with the waterproof function by integrally molding a seal portion made of a rubber-like elastic material with the lid member, can suppress a burr leakage, can do away with a scratch of the lid member, and can prevent a peeling between the lid member and the seal portion.

In order to achieve the object mentioned above, in accordance with the present invention, there is provided a lid member with a waterproof function which opens and closes an opening portion formed in a housing, characterized in that the lid member comprises:

a seal portion made of a rubber-like elastic material and provided with a projection portion which is integrally formed in one surface of a main body made of a resin material of the lid member and is stored within the opening portion, an annular projection portion which is integrally formed in an outer peripheral surface of the projection portion and comes into close contact with a peripheral surface of the opening portion, and a reinforcing portion which extends from the annular projection portion to the vicinity of a junction portion of the outer peripheral surface with the main body; and a retention portion which exists so as to come into close contact with an outer peripheral surface of the reinforcing portion, is integrally formed in a side of the main body and is made of a thermoplastic elastomer material.

Further, in order to achieve the object mentioned above, in accordance with the present invention, it is characterized in that the method comprises:

a step of, first of all, forming a retention portion which is made of a thermoplastic elastomer material;

a step of integrally forming the retention portion, a resin material main body of a lid member and a projection portion; and a step of integrally forming the seal portion with the projection portion in a state in which a molding metal mold forming the seal portion made of the rubber-like elastic material is pressed against the retention portion.

Effect of the Invention

The present invention achieves effects described below.

In accordance with the lid member with the waterproof function of the invention described in the first aspect, it is possible to achieve a thinning of the lid member with the waterproof function, to suppress a burr leakage, to do away with a scratch of the lid member and to prevent a peeling between the lid member and the seal portion.

Further, in accordance with the lid member with the waterproof function of the invention described in the second aspect, since it is possible to enhance a mechanical strength of the projection portion of the lid member, it is possible to apply a sufficient fitting pressure to the seal portion.

Further, in accordance with the lid member with the waterproof function of the invention described in the third aspect, it is possible to prevent the peeling of the seal portion from the lid member.

Further, in accordance with the lid member with the waterproof function of the invention described in the fourth aspect, it is possible to achieve a weight saving of the lid member. Further, since a part of the member stored within the housing such as the connector or the like can be accommodated in a space which is surrounded by the annular projection portion so that an internal space is expanded, it is possible to achieve a downsizing and a thinning.

Further, in accordance with the lid member with the waterproof function of the invention described in the fifth aspect, it is possible to achieve a weight saving of the lid member, and it is possible to do away with the scratch of the lid member and prevent the peeling between the lid member and the seal portion.

Further, in accordance with the lid member with the waterproof function of the invention described in the sixth aspect, it is easy to attach and detach the lid member, and a sealing performance is good.

Further, in accordance with the lid member with the waterproof function of the invention described in the seventh aspect, it can be preferably used in a waterproof of an electronic equipment, particularly, in a waterproof cell phone.

Further, in accordance with the method of manufacturing the lid member with the waterproof function of the invention described in the eighth aspect, not only it is possible to effectively prevent the matter that a part of the rubber-like elastic material generates the burr leakage protruding to the unnecessary position, but also it is possible to avoid a problem that the coated surface of the lid member main body 2 made of the resin material such as the polycarbonate or the like is damaged.

DETAILED DESCRIPTION OF PREFERRED EMBODIMENT

A description will be given of a best mode for carrying out the present invention.

Figure 1:
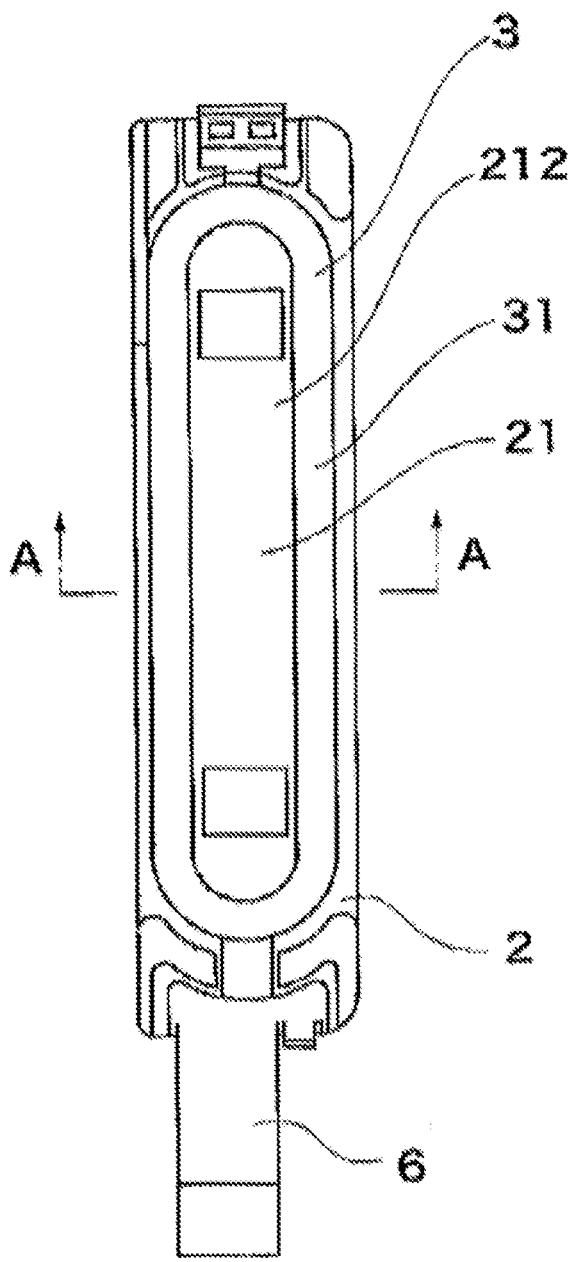
FIG. 1 is a front elevational view of a lid member with a waterproof function in accordance with the present invention.
Figure 2:
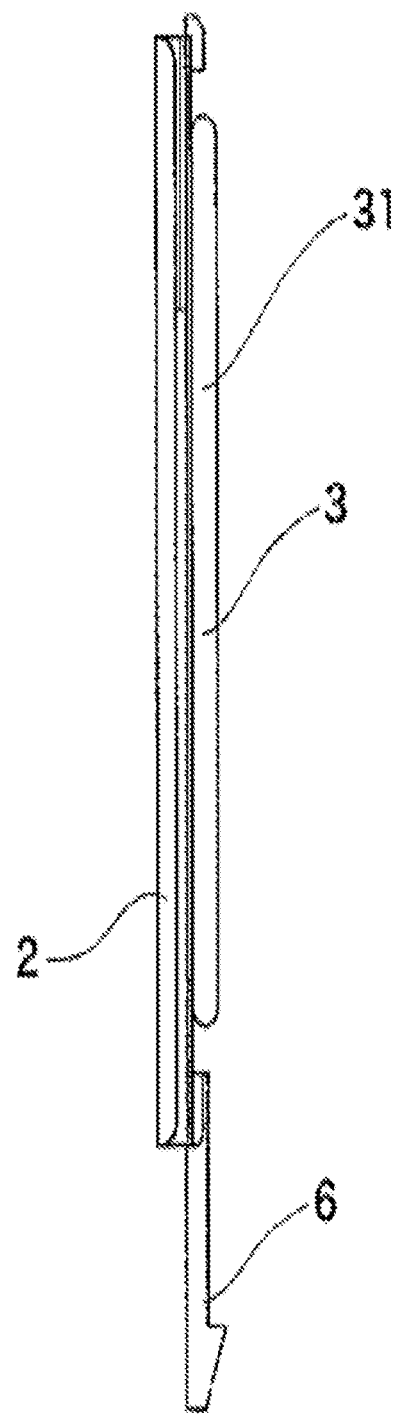
FIG. 2 is a side elevational view of the lid member with the waterproof function in FIG. 1.
Figure 3:
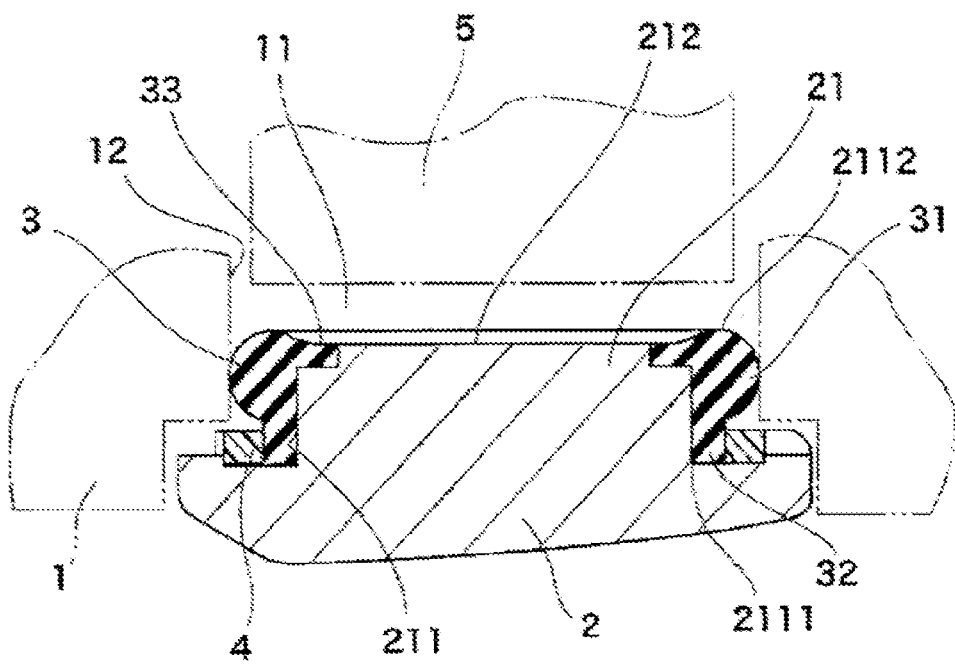
FIG. 3 is a cross sectional view along a line A-A in FIG. 1.

A lid member with a waterproof function in accordance with the present invention is used for opening and closing an opening portion 11 which is formed in a housing 1 forming a casing of an equipment of a portable terminal, as shown in FIG. 1 to FIG. 3.

A connector 5 is arranged in the opening portion 11.

Further, in one surface of a main body 2 made of a resin material of the lid member, there are arranged a seal portion 3 made of a rubber-like elastic material and provided with a projection portion 21 which is integrally formed in the main body 2 and is stored within the opening portion 11, an annular projection portion 31 which is integrally formed in an outer peripheral surface 211 of the projection portion 21 and comes into close contact with a peripheral surface 12 of the opening portion 11, a tubular reinforcing portion 32 which extends to the vicinity of a junction portion 2111 of the outer peripheral surface 211 with the main body 2 from the annular projection portion 31, and a retention portion 4 which comes into close contact with an outer peripheral surface side of the reinforcing portion 32, is integrally formed with a side of the main body 2 and is made of a thermoplastic elastomer material.

The projection portion 21 is formed as a columnar shape which corresponds to a shape of the lid member.

Further, the seal portion 3 bonds to an annular step portion which is formed in an outer peripheral surface of an end surface 212 (an upper surface on the drawing) of the projection 21, and is provided with an annular end surface reinforcing portion 33 which extends along the end surface 212.

In accordance with this structure, it is possible to effectively prevent the seal portion 3 from peeling off from the lid member side.

Further, the annular projection portion 31 is integrally provided in the vicinity of an upper end portion 2112 of the outer peripheral surface 211, and is formed as a circular arc cross sectional shape.

In accordance with this structure, it is easy to attach and detach the lid member, and a sealing performance is good.

Further, the lid member is fixed and retained to a side of the housing (the case) 1 by a band-like flexible band portion 6.

A method of manufacturing the lid member with the waterproof function in accordance with the present invention, first of all, forms the retention portion 4 which is made of the thermoplastic elastomer material, and integrally forms the retention portion 4, the main portion 2 made of the resin material of the lid member and the projection portion 21 in accordance with a two-color molding.

Next, the seal portion 3 made of the rubber-like elastic material is formed in a state in which a forming metal mold is pressed against the retention portion 4 made of the thermoplastic elastomer material.

By forming as mentioned above, not only it is possible to effectively prevent a part of the rubber-like elastic material from generating a burr leakage protruding to an unnecessary position, but also it is possible to avoid a problem that a coated surface of the lid member main body 2 made of the resin material such as the polycarbonate or the like is damaged.

In the present embodiment, the structure is made such that the retention portion 4 is provided only in the outer peripheral surface side of the reinforcing portion 32. It has no problem in the case that the forming metal mold comes into contact with a whole surface of the end surface 212, however, in the case that the forming metal mold comes into contact with only the vicinity of the end surface reinforcing portion 33, it is preferable that the retention portion 4 made of the thermoplastic elastomer is also provided in a position with which the forming metal mold comes into contact (an inner side of the end surface reinforcing portion 33).

As a rubber-like elastic material which is used in the seal portion 3, there can be listed up a nitrile rubber, an acrylic rubber, an EPDM, a CR, a silicone rubber, a fluorocarbon rubber, a natural rubber and the like, and they can be appropriately selected in correspondence to various intended uses so as to be used.

Further, as a resin material used in the lid member, there can be listed up an ABS resin, a polypropylene (PP), a polyethylene naphthalate (PEN), a polysulfone (PSF), a polyethylene (PE), a polystyrene (PS), an acrylic (PMMA), a polyethylene terephthalate (PET), a polyphenyrene ether (PPE), a nylon/polyamide (PA), a polycarbonate (PC), a polyacetal (POM), a polybutylene terephthalate (PBT), a polyphenyrene sulfide (PPS), a polyether ether ketone (PEEK), a liquid crystal polymer (LCP), a fluorocarbon resin, an urethane resin and the like, and they can be appropriately selected in correspondence to various intended uses so as to be used.

Further, as a thermoplastic elastomer material which is used in the retention portion 4, there can be listed up thermoplastic elastomers of a styrene group, an olefin group, a polyvinyl chloride group, an urethane group, a polyester group, a chlorinated polyethylene group and the like, and they can be appropriately selected in correspondence to various intended uses so as to be used.

Figure 4:
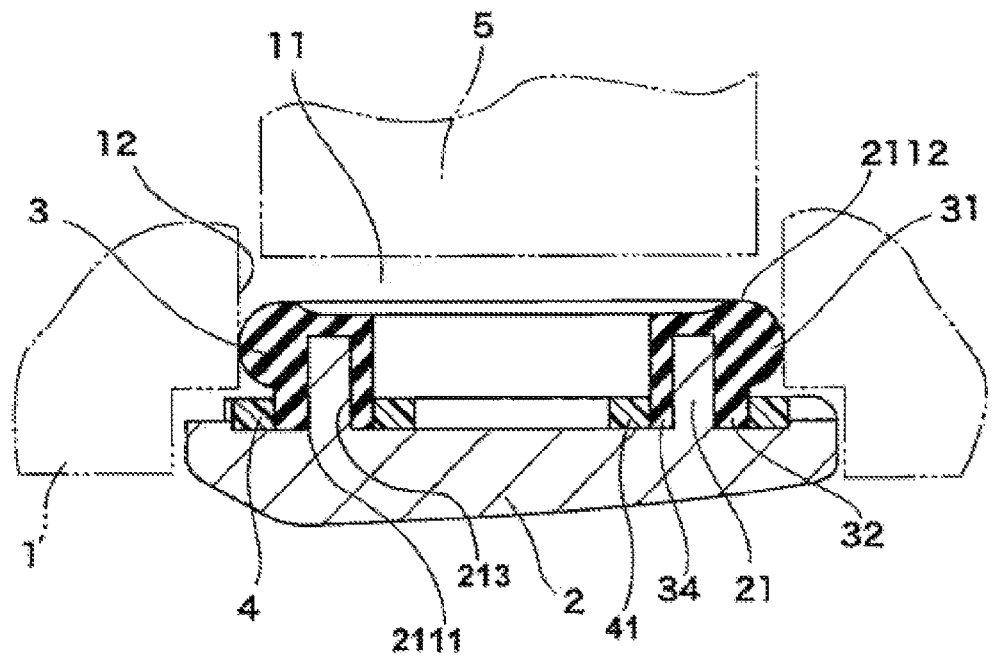
FIG. 4 is a view which shows a second embodiment in accordance with the present invention in the same manner as FIG. 3.

Next, a description will be given of a second embodiment in accordance with the present invention with reference to FIG. 4.

A different point from the embodiment which has been described previously exists in a matter that the projection portion 21 is annular.

Accordingly, the seal portion 3 covers a whole of the projection portion 21.

As a result, an inner retention portion 41 is arranged in an inner peripheral side of an inner reinforcing portion 34 of the seal portion 3 which is bonded to the inner peripheral surface 213 of the projection portion 21, the inner retention portion 41 existing so as to come into close contact with the inner reinforcing portion 34, being integrally formed in the side of the main body 2 and being made of the thermoplastic elastomer material.

In accordance with this structure, it is possible to achieve a weight saving of the lid member, it is possible to do away with a scratch of the lid member, and it is possible to prevent the projection portion 21 of the lid member and the seal portion 3 from peeling.

INDUSTRIAL APPLICABILITY

The lid member with the waterproof function in accordance with the present invention can be used in the waterproof of the electronic equipment, particularly in the waterproof cell phone.

What is claimed is:

1. A lid member with a waterproof function which opens and closes an opening portion formed in a housing,
    wherein the lid member comprises:
    a seal portion made of a rubber-like elastic material and provided with a projection portion which is integrally formed in one surface of a main body made of a resin material of said lid member and is stored within said opening portion, an annular projection portion which is integrally formed in an outer peripheral surface of said projection portion and comes into close contact with a peripheral surface of said opening portion, and a reinforcing portion which extends from said annular projection portion to the vicinity of a junction portion of said outer peripheral surface with said main body; and
    an annular retention portion which exists so as to come into close contact with a whole of an outer peripheral surface of said reinforcing portion, is integrally formed in a side of said main body and is made of a thermoplastic elastomer material.

2. The lid member with a waterproof function as claimed in claim 1, wherein said projection portion is formed as a columnar shape.

3. The lid member with a waterproof function as claimed in claim 1, wherein said seal portion is provided with an end surface reinforcing portion which is bonded to a part of an end surface of said projection portion.

4. The lid member with a waterproof function as claimed in claim 1, wherein said projection portion is formed as an annular shape.

5. The lid member with a waterproof function as claimed in claim 4, wherein said seal portion covers a whole of said projection portion, and comprises an inner retention portion which exists so as to come into close contact with an inner peripheral side of an inner reinforcing portion of said projection portion, is integrally formed in a side of said main body and is made of a thermoplastic elastomer material.

6. The lid member with a waterproof function as claimed in claim 1, wherein said annular projection portion is integrally provided in the vicinity of an upper end portion of said outer peripheral surface and takes on a circular arc cross sectional shape.

7. The lid member with a waterproof function as claimed in claim 1, wherein the lid member is preferably used in a waterproof of an electronic equipment, particularly in a waterproof cell phone.

* * * * *